July 25, 1933.     J. GOOD     1,920,012
INTERNAL COMBUSTION ENGINE
Original Filed July 12, 1920
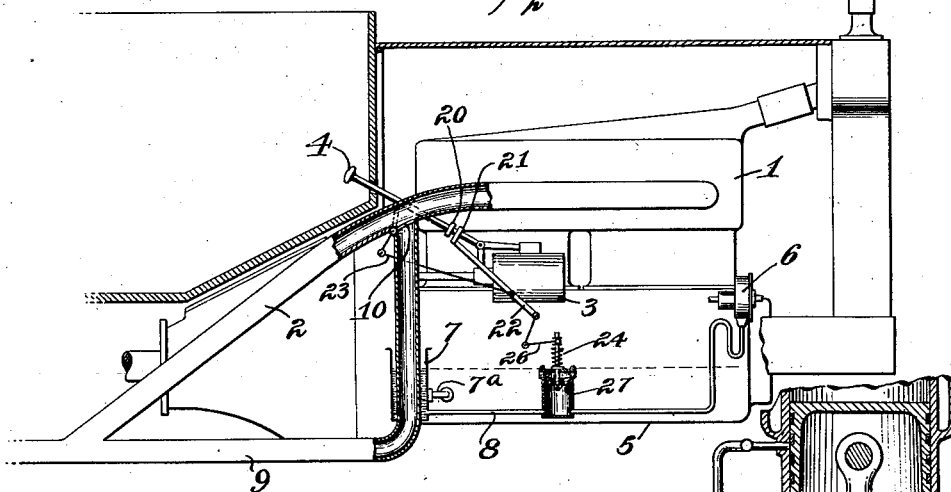
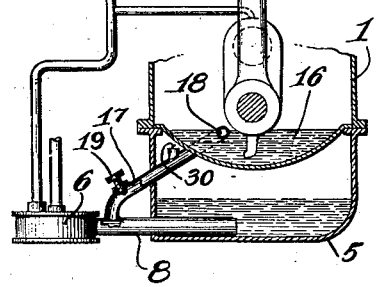
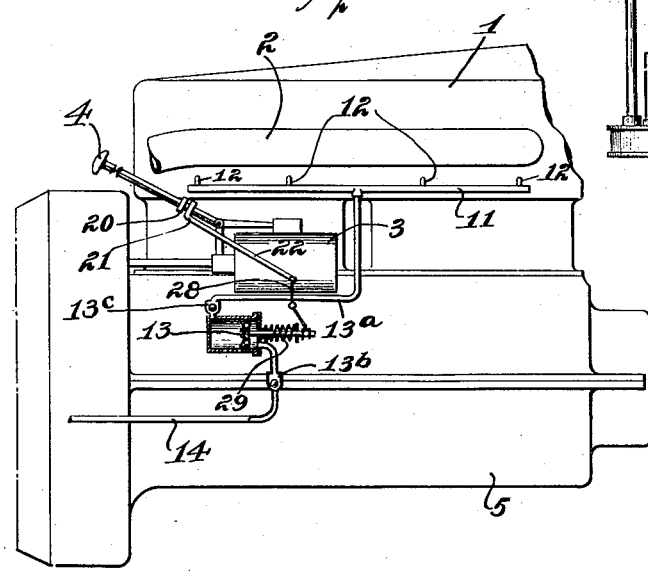

Patented July 25, 1933

1,920,012

UNITED STATES PATENT OFFICE

JOHN GOOD, OF GARDEN CITY, NEW YORK, ASSIGNOR TO GOOD INVENTIONS CO., OF NEW YORK, N. Y., A CORPORATION OF NEW YORK

INTERNAL COMBUSTION ENGINE

Application filed July 12, 1920, Serial No. 395,440. Renewed April 22, 1931.

It has been determined that a relatively large part of the total wear in internal combustion engines occurs during the first few moments of running after the engine is started, because at such time the lubricant is colder than during normal running and accordingly abnormally viscous, so that it is not freely distributed to the wearing surfaces. The objects of my invention are to minimize this and other ill effects of temporary abnormal lubricant viscosity accompanying temperatures lower than those of normal running, which effects are particularly noticeable in automotive engines because they are generally subject to out-door conditions. It is also an object of my invention to facilitate the starting of automotive engines by local and immediate modification of the viscosity of the lubricant. To these ends, I supply some or all of the wearing surfaces of the engine initially with a thinner or less viscous lubricant than that which will be found at the moment in the crank case of the engine or in its lubricant reservoir. Within my invention this thinner lubricant may be a lubricant entirely distinct from the lubricant normally used by the engine or it may be a specially thinned part of the normal lubricant, or merely a divided and naturally thin part or constituent of the normal lubricant, all as more particularly described hereinafter. The supply of such thinner lubricant to the wearing surface is effected manually or automatically and may be accomplished by the same act which starts the engine; preferably also the supply of lubricant thinner than that contained in the main lubricant reservoir at the moment is discontinued automatically as soon as the normal lubricant attains its proper working viscosity.

In the accompanying single sheet of drawing I have shown several different embodiments of my invention for the purpose of illustrating its principle and scope. Fig. 1 illustrates diagrammatically an internal combustion engine with an exhaust gas heater between the crank case or oil sump and the oil pump; Fig. 2 illustrates diagrammatically the means for using a lubricant different from that of the normal lubricant, or of a thinner for the usual lubricant, and Fig. 3 illustrates a means for thinning by heating and then temporarily using a part only of the normal lubricant until the remainder is brought to normal viscosity.

In the drawing, the engine 1 has the usual sump 5 in the bottom of its crank case and for purposes of description this may be understood to constitute the normal reservoir of engine lubricant. The lubricant is withdrawn from this reservoir and distributed through pipes or otherwise to the various bearings or points to be lubricated by the action of the engine or an engine-driven oil pump 6 in the usual way and from these points drains back again into the sump for continued circulation. When the temperature falls the viscosity of the lubricant increases and tends to solidification in which condition its lubricating qualities are impaired and even in moderately low temperatures so much resistance is presented to the circulation that the lubricating pump 6 is unable to supply the usual or suitable quantities. On such occasion therefore, the engine runs stiffly and more or less dry and wear occurs at an abnormally high rate until the temperature and viscosity of the lubricant attains normality. The remedy for this condition as contemplated by the structure of Fig. 1 consists in supplying an oil heater which is active immediately on starting to heat the oil in transit to the various points to be lubricated and ceases action after a period when the engine has warmed up. Such a heater is represented by a small chamber 7 intervening in the suction line of the pump between the latter and the main reservoir or crank case which contains a portion of the lubricant and isolates it from the larger body of lubricant contained in the main reservoir. This chamber may be variously arranged and is here shown as connected by pipe 7a with the crank case and by pipe 8 to the pump 6. The heater may receive its heat from any source, that is to say, by an individual burner or an electric heating coil or otherwise but it is entirely practical and most convenient to use the heat from an engine-heated fluid for example the engine exhaust gases, since heat from these sources is promptly available when the engine is started. For this purpose, a branch or a by-pass 9 is shown extended from the main exhaust pipe 2 through the heater 7; the space or passageway for the lubricant within the heater is relatively narrow, as represented by the small spacing between the wall of the pipe 9 and the outer wall of the container 7, and as before mentioned the chamber is small so that the oil capacity of the heat exchange device is small relative to the main lubricant reservoir. The lubricant in the heater is heated quickly therefore, on starting the engine, and affords a quickly thinned source of lubricant for the engine. When the exhaust gases are used as the source of heat, continuous use of these gases may result in overheating the oil later; therefore when the exhaust gases are employed, I prefer to employ a by-pass such as 9 and control the flow therethrough by a valve 10, the function of which is to divert more or less of the exhaust through the by-pass as circumstances may require.

The valve 10 is connected for operation in the case shown, by the pedal 4 which is normally used to operate the starting motor 3 to crank the engine. A collar 20 on the pedal plunger engages the head 21 of a push link 22, the other end of which is pivoted to a bell crank 26. The link 22 is connected by a rod 23 with the crank arm on valve 10 so that when the pedal is pushed down as in starting the engine, the valve is opened to the by-pass so as to pass all the exhaust to the oil heater. The bell crank 26, simultaneously operated, depresses the dash pot piston 27 against its spring 24 and when the pressure on the pedal is released this dash pot restrains the return movement so that valve 10 directs exhaust gas to the temporary heater for a predetermined period, which is long enough to enable the main body of lubricant to acquire an operating fluidity. The first discharge of exhaust through the by-pass heats the relatively small body of oil in the chamber 7 which, being in the suction line of the pump, supplies the latter with oil of sufficient fluidity to pass immediately and freely through the lubricant system. The suction effect of the pump is desirably also transmitted to the liquid, below the piston in the dash pot, as this tends to restrain the return of the piston until normal fluidity is attained. The dash pot for this purpose is shown connected directly in the suction line. Eventually, the whole body of engine lubricant will attain a normal viscosity and at such time the dash piston will have returned to normal position and valve 10 will have closed to the by-pass, and thereafter the chamber 7 will merely conduct the oil without heating it. The restarting of the engine while still hot does not result in unnecessary or excessive heating in the chamber 7 because, under the greater fluidity of hot oil, the dash piston restores itself promptly, and especially as the effect of the pump suction is less in proportion to the viscosity of the oil beyond the dash pot, the chamber 7 is in effect a part of the crank case sump, since it derives its oil dieectly therefrom but it is thermally isolated from it so that the effect of the hot exhaust gas is concentrated on the oil therein. Although shown open at the top the chamber may be covered or sealed, or it may be provided with the usual breather, so that any fuel in the oil which is vaporized by the heat may have an escape. It will be obvious that the valve 10 may be operated in various ways, other than that shown and a thermostatic control of it is sometimes desirable and entirely feasible since the need for it is entirely a function of temperature.

Fig. 2 illustrates an arrangement of apparatus where a separate liquid medium is used for supplying the engine bearings with a less viscous lubricant. In this case, the plunger link 22 operates a pump 13 through a bell crank 28, and the pump is connected to draw the separate liquid by way of pipe 14 from a tank, not shown, and deliver it by way of pipe 13a to a small manifold 11 which has a branch 12 leading to the piston region of each cylinder. The operation of the starting pedal thus injects a small quantity of the separate liquid into each cylinder. Inasmuch as the engagement of the piston with the cylinder walls represents one of the largest friction sources in the engine, a small amount of the thin liquid injected into the cylinders at this point, will so relieve the effect of chilled lubricant therein as to permit the piston movement to take place very readily, and thereby enables the starting motor to rotate the engine with less effort than otherwise and with a sufficiently vigorous impulse to insure starting the combustion cycle even in very cold weather. The engine fuel may constitute the separate thin liquid in which case the pipe 14 is connected to the carburetor float bowl. A small amount of gasoline injected in the manner described will work no serious effect on the lubricating medium and of course its use may be discontinued in warm weather. The check valves 13b and 13c represent the suction and outlet valves of the pump and it will be understood that the location and design of these valves and of the pump, as well as the arrangement of its operating connections, are all subject to adaptation to the conditions in hand, the illustration thereof in Fig. 2 being merely diagrammatic.

In the embodiment of the invention illustrated in Fig. 3, the part of the total supply of engine lubricant which first receives heat from the freshly started engine, and which is thinned thereby, is kept separate and circulated to the substantial exclusion of the rest of the lubricant until the latter is warmed up, so as to become equally fluid, whereupon the whole body is circulated. The engine driven oil pump 6 delivers the lubricating oil through the oil pipes shown to the cylinders and crank shaft and other bearings in the usual way and such oil is heated by its contact with these parts, and escaping therefrom, is caught in a basin 16 where it is retained separate from the main body of lubricant. The heat is derived from the combustion in the cylinders, transmitted through the cylinder walls and piston as well as from the friction of the rotary bearings all of which tends to reduce the viscosity of the oil first collected in the basin 16 making it capable of easy circulation. The source of the heat might be elsewhere, for example, in a supplemental burner or other heater, but it is generally sufficient to heat the small part first circulated in the manner just described. The suction side of the pump is connected by a pipe 17 having a choker 19, to the basin 16 and about the point in the latter where it is desired to keep the level of the oil. It is also connected by a larger pipe 8 with the main oil sump or reservoir 5 of the crank case. The warmed and fluid oil in the basin 16 will flow to the pump in preference to the cool and thicker oil in the reservoir 5, as controlled by the adjustment of the chocker, and only a small or negligible part will flow through the pipe 8. That is to say, so long as the main body of oil is cold the engine will be lubricated by the relatively thin oil from basin 16 and will therefore receive, more or less immediately an adequate lubrication. But as the main body warms up, by conduction of heat through the metal walls of the crank case, it will enter the pump as freely as or more freely than the basin oil and then the whole body of oil will come into normal circulation. When this condition obtains the excess in basin 16 which does not flow directly to the pump will flow by gravity through the overflow 30 into the main reservoir 5. The basin 16 may be obviously incorporated in the engine structure in various ways and is here shown as serving the further purpose of a splash pan.

In all of the forms above described it will be seen that the wearing or friction surfaces of the engine are more or less immediately supplied with lubricating oil so thin as to constitute a proper lubrication and at a time when the main body of engine lubricant is too cold and thick to serve that purpose. The thin or thinned oil is in each case separated from the thick oil at least until it has escaped from the wear surface and thereafter it may be returned to the main body of lubricant or circulated for a time independently thereof as preferred. Preferably however, it is immediately returned to the main body as indicated in Fig. 1 so that its heat aids in quickly raising the temperature of the whole system.

I claim:

1. In an internal combustion engine, the combination of a main lubricant reservoir from which a wearing surface of the engine is supplied with lubricant during normal operation of the engine, a secondary lubricant container, means providing a lubricant passage leading from said secondary container to said wearing surface, and mechanism for controlling the supply of lubricant thinner than the lubricant contained in said main reservoir, from said secondary container to said wearing surface through said passage for short periods of time, said mechanism being so arranged that the supply of the thinner lubricant to said wearing surface can be substantially discontinued without stopping the supply of lubricant thereto from said main reservoir.

2. In an internal combustion engine, the combination of a main lubricant reservoir from which a wearing surface of the engine is supplied during normal operation of the engine, a secondary container for a liquid medium, means providing a passage leading from said secondary container to said wearing surface, and mechanism for controlling the supply of said medium from said secondary container to said wearing surface through said passage for short periods of time, said mechanism being so arranged that the supply of said medium to said wearing surface can be discontinued without stopping the supply of lubricant thereto from said main reservoir.

3. In an internal combustion engine, the combination of a lubricating system including an oil pump for normally supplying lubricant to wearing surfaces of the engine, a self-starter for the engine, and means for supplying lubricant to a wearing surface of the engine for short periods of time independently of the operation of said pump, said means being related to said self-starter for operation simultaneously with the operation of the self starter.

4. In an internal combustion engine having a cylinder and a piston therein, the combination of a lubricating system including an oil pump for normally supplying lubricant to wearing surfaces of the engine, a self-starter for the engine, and means for supplying lubricant to said piston and its cylinder walls for short periods of time independently of the operation of said pump, said means being related to said self-starter for operation simultaneously with the operation of the self-starter.

5. In an internal combustion engine, the combination of a main lubricant reservoir, means for supplying a wearing surface of the engine from said reservoir directly during normal operation of the engine, the lubricant passing from said surface returning to said reservoir, a secondary lubricant container interposed in the path of return of lubricant from said wearing surface to said main reservoir, and means for supplying said wearing surface from said secondary container directly for short periods of time, said mechanism being so arranged that said direct supply of lubricant from said secondary container can be substantially discontinued without stopping said supply of lubricant from said main reservoir.

6. In an internal combustion engine, a main reservoir containing the major portion of the engine lubricating oil, means providing a passage for leading lubricating oil from said reservoir to a wearing surface of the engine, said means including an oil pump to propel the lubricating oil through said passage under pressure and a heat exchange device having walls providing a relatively narrow passageway for the engine lubricant, said passageway having small lubricating oil capacity relative to said main reservoir, and means to conduct engine-heated fluid to the opposite side of a wall of said heat exchange device to heat the oil in said passageway.

7. In an internal combustion engine, a main reservoir containing the major portion of the engine lubricating oil, means providing a passage for leading lubricating oil from said reservoir to a wearing surface of the engine, said means including an oil pump to propel the lubricating oil through said passage under pressure and a heat exchange device having walls providing a relatively narrow passageway for the engine lubricant, said passageway having small lubricating oil capacity relative to said main reservoir, means to conduct exhaust gas from the engine to the opposite side of a wall of said heat exchange device to heat the oil in said passageway, and means to materially diminish the heating of the lubricating oil by said heater.

8. An internal combustion engine having a circulating lubricating oil system adapted for quickly furnishing heated oil to wearing surfaces of the engine when the engine is started cold, said circulating system including in the oil path or circuit, a reservoir acting as the main storage and supply of engine oil, a heat exchange device, separated from the body of the oil in the reservoir, having walls forming an oil passageway of relatively thin section, said oil passageway having also small oil capacity relative to said main oil supply and being thereby adapted for quick temperature rise of the oil therein, said device also having a passageway for engine-heated fluid immediately contiguous to said oil passageway, and an engine-driven pump to propel oil from said main supply reservoir through said oil passageway and to said wearing surfaces.

JOHN GOOD.